Figure 1:
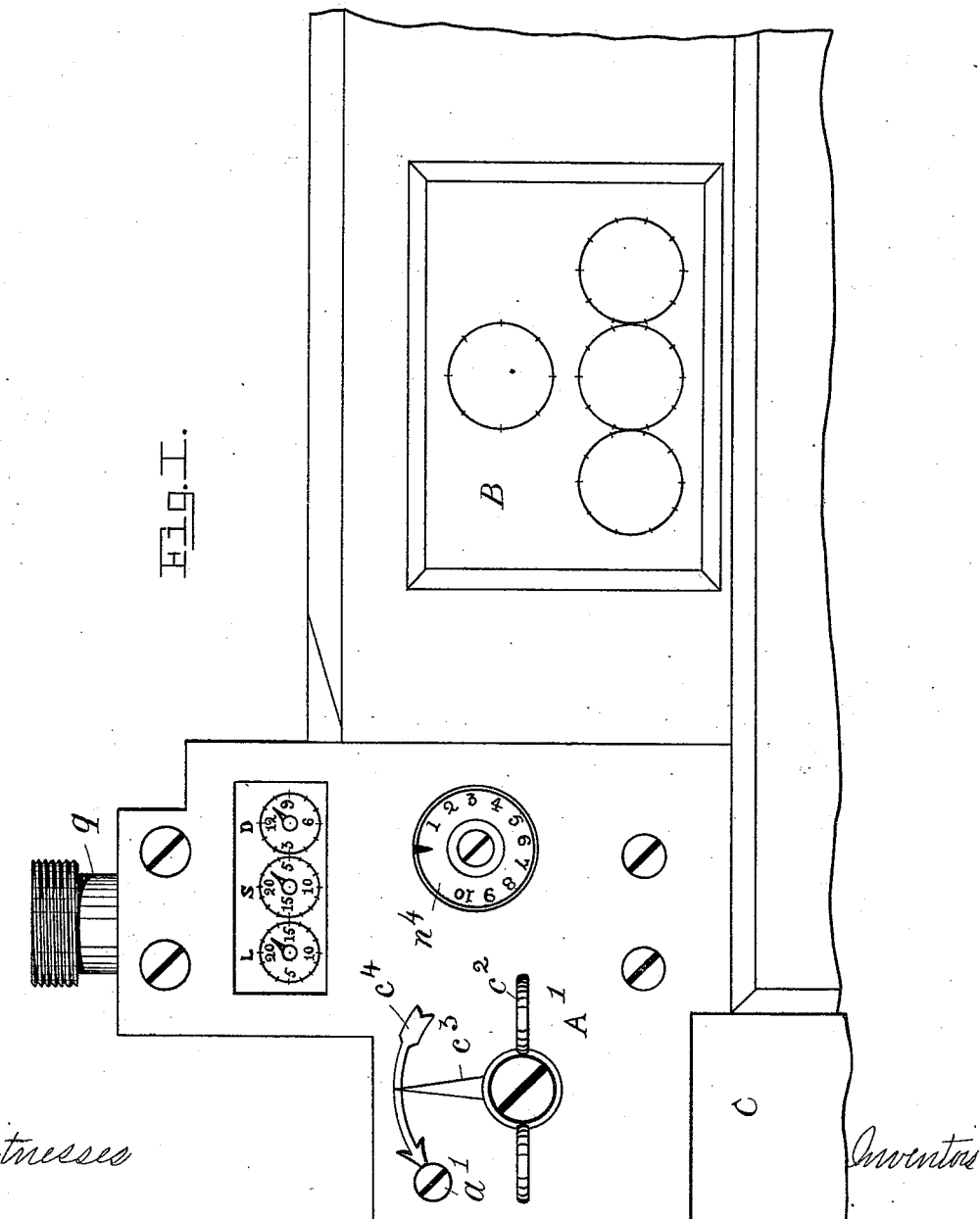

(No Model.) 4 Sheets—Sheet 1.
T. THORP, T. G. MARSH & J. HAYNES.
PREPAYMENT GAS METER.

No. 543,951. Patented Aug. 6, 1895.

Fig. I.

Witnesses
A. C. Pfaff.
Emma C. Deghuie

By their Attorney
E. P. Thompson

Inventors
T. Thorp,
T. G. Marsh,
J. Haynes, (No Model.) 4 Sheets—Sheet 2.

T. THORP, T. G. MARSH & J. HAYNES.
PREPAYMENT GAS METER.

No. 543,951. Patented Aug. 6, 1895.

Witnesses
A. C. Pfaff
Emma C. Dighuic

Inventors
T. Thorp,
T. G. Marsh,
J. Haynes.
By their attorney,
Edward P. Thompson (No Model.) 4 Sheets—Sheet 3.
T. THORP, T. G. MARSH & J. HAYNES.
PREPAYMENT GAS METER.
No. 543,951. Patented Aug. 6, 1895.
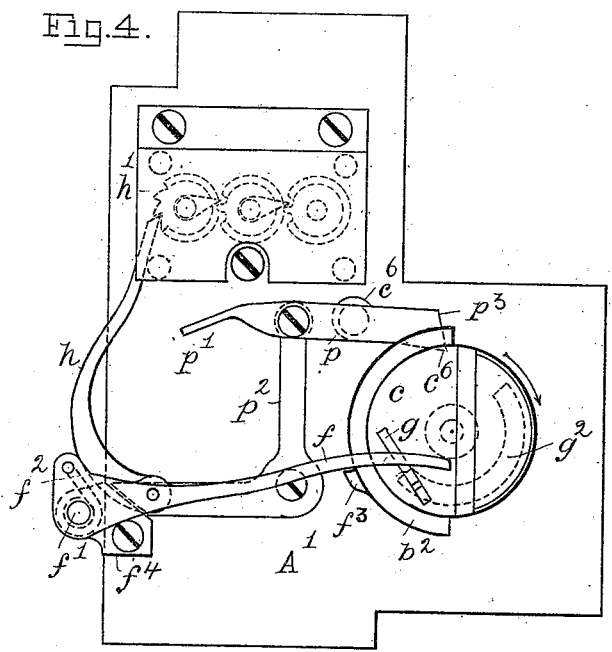
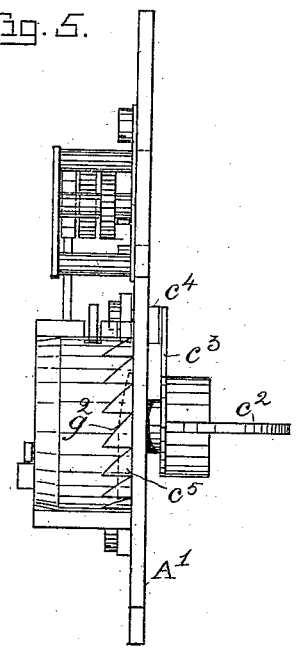
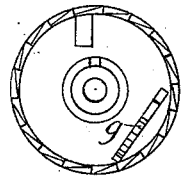
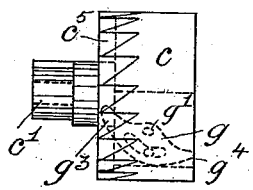
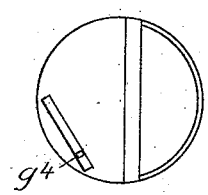
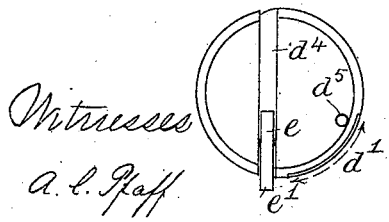
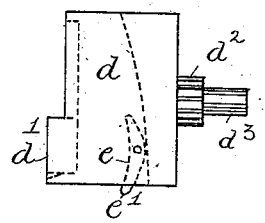
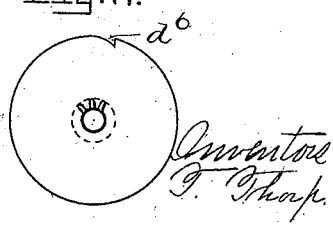

(No Model.) 4 Sheets—Sheet 4.

T. THORP, T. G. MARSH & J. HAYNES.
PREPAYMENT GAS METER.

No. 543,951. Patented Aug. 6, 1895.

WITNESSES:
a. l. Pfaff.
E. C. Deghuee

INVENTORS,
T. Thorp, T. G. Marsh & J. Haynes.
ATTORNEY,
Edward P. Thompson

UNITED STATES PATENT OFFICE.

THOMAS THORP, OF WHITEFIELD, THOMAS GARDINER MARSH, OF MANCHESTER, AND JOHN HAYNES, OF LIVERPOOL, ENGLAND.

PREPAYMENT GAS-METER.

SPECIFICATION forming part of Letters Patent No. 543,951, dated August 6, 1895.

Application filed October 22, 1894. Serial No. 526,630. (No model.)

*To all whom it may concern:*

Be it known that we, THOMAS THORP, residing at Whitefield, THOMAS GARDINER MARSH, residing at Manchester, and JOHN HAYNES, residing at Liverpool, in the county of Lancaster, England, subjects of the Queen of Great Britain, have invented certain new and useful Improvements in Prepayment Gas-Meters, of which the following is a specification.

Our invention relates to gas-meters delivering on prepayment a quantity of gas proportionate to the number of coins inserted into a slot; and it consists in the improved arrangement or construction of the mechanism and parts thereof and combination of the same with each other and the gas-meter.

In the prepayment mechanism hitherto made the motion of the coin receiver or carrier is usually transmitted to the valve and index of the quantity of gas paid for and unconsumed by means of pawls and ratchet-wheels or equivalent mechanism depending upon gravity or spring-pressure for its correct action, which is unreliable, as the pawl may miss a tooth of the ratchet or the equivalent parts may slip, whereby the consumer or the gas company is detrimentally affected, according to the arrangement of the mechanism. Another defect of such meters is that the closing of the valve has to be effected when the quantity paid for is consumed by the action of the meter drum or bellows, and as the pressure operating such drum decreases as the valve becomes more and more closed the valve is not closed tight and allows gas to pass through the meter.

The object of our invention is mainly to remedy these defects by arranging the mechanism so that the coin-carrier must make an entire revolution for each coin inserted, and transmitting such rotary motion to the valve-operating mechanism by toothed gearing, in combination with an improved construction of the valve, so that it is closed tight by the gas-pressure in the main when lightly closed by the meter mechanism, and, further, to simplify the prepayment mechanism and arranging it so that it can be bodily attached to or removed from a meter, so that the latter can be used either as a prepayment or ordinary meter.

Figure 2:
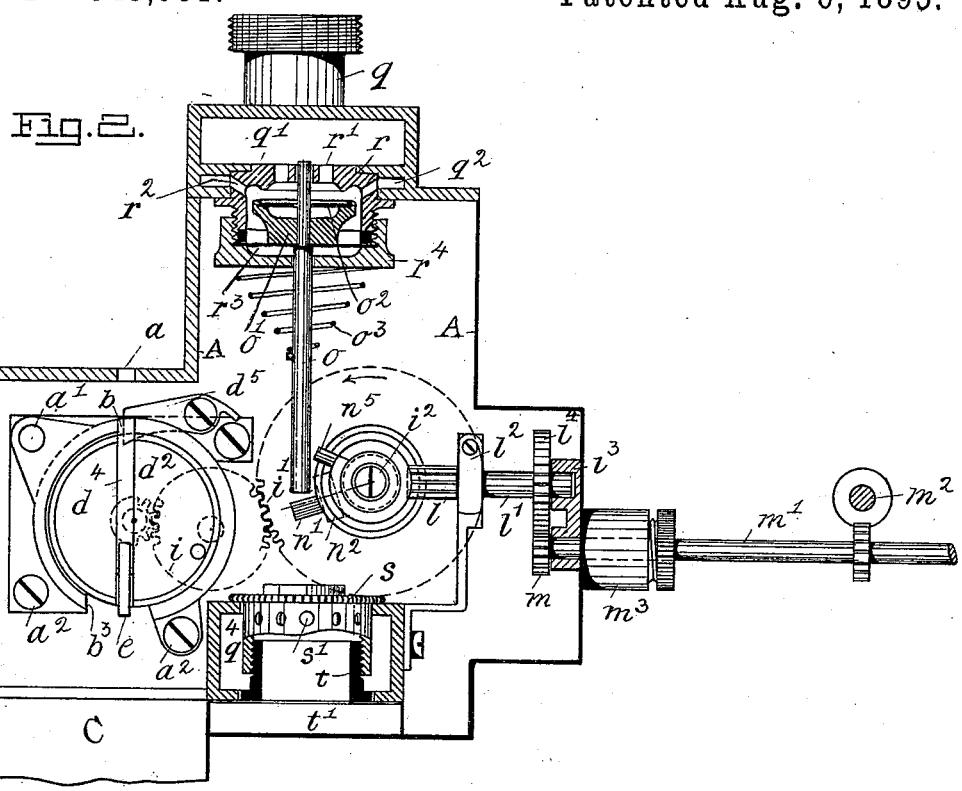
Figure 3:
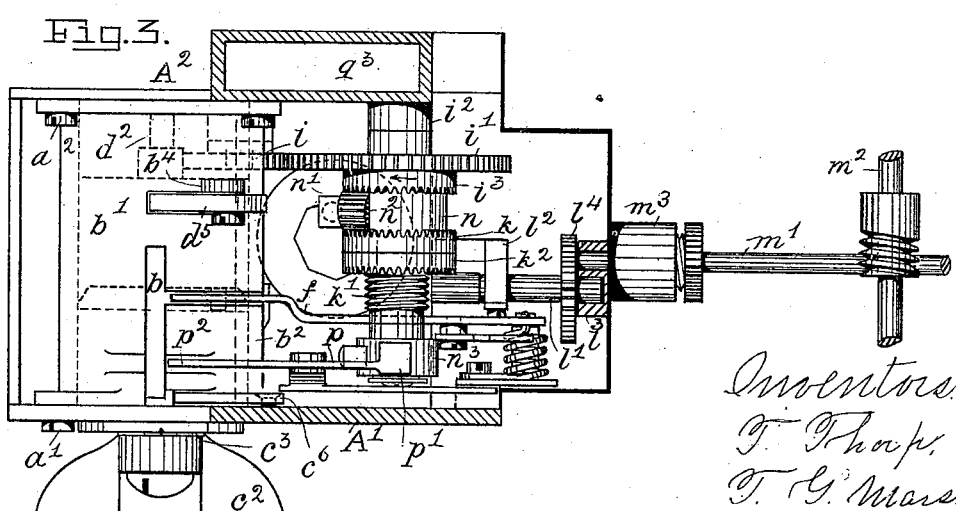
Figure 12:
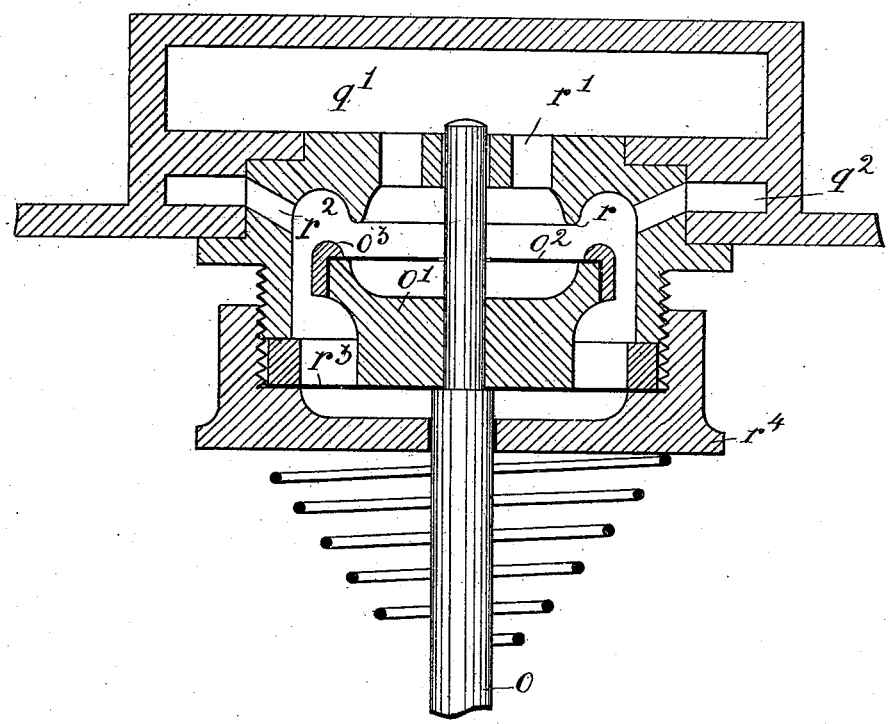

On the drawings annexed hereunto, Figure 1 shows an outside front view of the upper part of a dry meter with the prepayment mechanism attached thereto; Fig. 2, a vertical section through the prepayment mechanism, as seen from the front; Fig. 3, a plan with the top and valve removed; Fig. 4, a view of the front plate with parts attached thereto, as seen from the back; Fig. 5, a side view of the same; Figs. 6, 7, and 8, a front, side, and back view of the front coin-carrying cylinder; Figs. 9, 10, and 11, similar views of the back coin-carrying cylinder. Fig. 12 shows a vertical section of the valve-casing, and Fig. 13 a horizontal section of the same through the outlet-ports on an enlarged scale.

The improved prepayment mechanism is contained in a casing A, which is attached to the upper part of the gas-meter at the side of the usual consumption-index B, Fig. 1. The coin is inserted through a slot $a$ into a slot $b$, formed in a hollow cylinder $b'\ b^2$, which is made in parts, the part $b^2$ being fixed to the front plate A' of the casing A, and the part $b'$ to the back plate A$^2$ by screws $a^2$ and to the front plate A' by screw $a'$. The slot $b$ is placed to one side of the center line of the cylinder and is made about as long as the diameter of the coin to be used for prepayment. The bottom side of the cylinder has a wider slot $b^3$, extending for the full length of the bottom side. Into the cylinder $b'\ b^2$ are placed two solid coin-carrying cylinders $c$ and $d$. (Shown separately by Figs. 6 to 8 and 9 to 11, respectively.) The front coin-cylinder $c$ is formed with or has fixed to it a spindle $c'$, which passes through the front plate A' and has a winged handle $c^2$ or other handle or button fixed upon it, by means of which the cylinder $c$ can be turned, a pointer $c^3$, likewise fixed to the spindle, indicating the position in which the cylinder must be for receiving the coin, and an arrow $c^4$ shows the direction in which the handle is to be turned. Ratchet-teeth $c^5$ are cut in the front edge of the cylinder $c$, and a pawl $c^6$, fulcrumed on the front plate A', engages with them and prevents the handle from being turned in the wrong direction.

The back coin-carrying cylinder $d$ is formed with a projecting rim cut away for the greater part, except the length $d'$, so that, while the latter rests against the face of the front cylinder $c$, there is a space between the cylinders for the rest of the circumference. The cylinder has a pinion $d^2$ fixed upon its back end and a projecting stem $d^3$, which butts against the back plate $A^2$ and holds the cylinder in position in its longitudinal direction.

Each coin-carrying cylinder has a slot in its face opposite the other, the slots being to one side of the center and coinciding with the slot $b$ in the top of the hollow cylinder, so that a coin dropped into the latter passes into the slots in the cylinders $c$ and $d$ when their position coincides with the upper slot. In order to prevent the coin from dropping through or the back cylinder $d$ from being turned when no coin is inserted, a tumbler-lever $e$ is arranged in the slot $d^4$, the end $e'$ of which lever projects from the cylinder and arrests the turning of the same by coming against the edge of the slot $b^3$ in the bottom side of the hollow cylinder, unless withdrawn by the insertion of a coin of the prescribed size, which by pushing back the upper end of lever $e$ lifts the end $e'$ up into the cylinder and allows it to be turned, the lever $e$ forming at the same time a rest for the coin. A coin of smaller size will simply drop through the slot into the receptacle C.

When a correct coin has been inserted it will connect the two cylinders $c$ and $d$ or act as a driver, so that when the front cylinder is turned by means of the handle $c^2$ the back cylinder is turned with it by means of the coin till the latter is expelled after about half a revolution. For this purpose the lever $f$ is arranged fulcrumed on a stud $f'$ in a bracket $f^4$, screwed to the front plate $A'$, which lever $f$ is pressed downward by a spring $f^2$ and extends into the space between the coin-cylinders $c$ and $d$ through a slot in the outer cylinder $b'$ $b^2$. When the cylinders $c$ and $d$ are turned after insertion of a coin, the projecting rim part $d'$ catches under the lever $f$, which is held in position just above the leading edge of $d'$ when in its starting position by means of a rest $f^3$ on the fixed cylinder $b^2$, and raises up the lever $f$ above the coin till, after making about half a revolution, the rim part $d'$ liberates the lever, which, slipping off, pushes, under the action of the spring $f^2$, the coin out of the slots into the coin-receptacle C arranged below them. This arrangement prevents fraud by the insertion of coins smeared with wax or other sticky substance with the object of turning the mechanism round several times with one coin.

When the coin has been expelled, the connection formed by it between the front and back coin-cylinders $c$ and $d$ is dissolved, and the back cylinder $d$ would remain in the position it then occupies, while the front cylinder is turned farther round, unless in the meantime another connection between the cylinders were made. This is done in the following manner: In a slot in the front coin-cylinder $c$ a lever $g$ is mounted on a pivot $g'$ and is in the position shown on Fig. 7 when the cylinder is placed in the coin-receiving position. The cylinder is recessed at the front under the ratchet-teeth, and in the recess an inclined segment $g^2$, Figs. 4 and 5, is fixed to the front plate $A'$, which the nose $g^3$ of the lever encounters before the cylinder has made half a turn. The lever $g$ is thereby turned backward and the other end $g^4$ of the same protruded from the face of the cylinder, so that it catches behind the peg $d^5$ fixed in the face of the back cylinder $d$, Fig. 9, and this cylinder continues to be turned by the front cylinder after the coin has been rejected until the end $g^4$ of the lever $g$ catches against the lever $f$, which turns it back, so as to push it in and liberate the peg $d^5$ at the moment the cylinders have made a complete revolution, the end $g^3$ having slipped off the end of the inclined segment $g^2$ in the meantime. By these means the two cylinders are constrained to make an entire revolution after the insertion of each coin before another coin can be inserted. The number of revolutions and coins paid in may be registered on an index in any convenient manner—for instance, by attaching a pawl $h$, Fig. 4, to the lever $f$, which pawl acts on a ratchet-wheel $h'$ and advances it by a tooth for each rotation of the coin-cylinders, this movement being indicated by a pointer on a dial D in front of the meter. Other dials S L may be arranged with pointers actuated from the spindle of the ratchet-wheel through single cogs and spur-wheels, so as to indicate the sum total of the coins inserted into the meter in pounds, shillings, and pence, or dollars, dimes, and cents, or other denominations of the coinage used, if desired. This index may be omitted if not desired.

The mechanism for opening the inlet-valve for the gas by the rotation of the coin-cylinders and closing the same by the meter when the quantity paid for has been consumed may be arranged in any convenient way—for instance, by actuating a ratchet-wheel by means of a pawl reciprocated by the rotation of the cylinder; but this arrangement has the disadvantage that a tooth of the ratchet may be missed, and we prefer to arrange the mechanism to act in a positive manner, as follows: Upon the end of the back cylinder $d$ we fix or form a spur-wheel $d^2$, meshing with a carrier-wheel $i$, which meshes with a spur-wheel $i'$, mounted loosely upon a stud $i^2$ and formed with or attached to a crown-wheel $i^3$ or an equivalent bevel-wheel. Opposite to the wheel $i^3$ another equal crown-wheel $k$ or equivalent bevel-wheel is likewise loosely mounted upon a sleeve $n$ on the stud and formed with a screwed boss $k'$, upon which another crown-wheel $k^2$ is screwed, which can be changed for others having a greater or less number of teeth. This crown-wheel meshes with a pinion $l$, formed on a spindle $l'$, which is supported in brackets $l^2$ $l^3$ and carries a spur-wheel $l^4$, gearing with a pinion $m$ upon a shaft $m'$, that passes through a stuffing-box $m^3$, soldered to the case of the prepayment mechanism. The shaft $m'$ is rotated through a worm and worm-wheel or otherwise from the shaft $m^2$, which drives the usual consumption-index B of the gas-meter.

The arrangement for driving the shaft $m'$ may be varied according to the constructive arrangement of the meter and index-driving mechanism. The long sleeve $n$, which is loose upon the stud $i^2$, is formed with a boss between the crown-wheels $i^3$ and $k$, into which is screwed or fixed a stud $n'$, upon which a spur-wheel $n^2$ is mounted, meshing with both crown-wheels. If bevel-wheels are used instead of crown-wheels, a bevel-wheel meshing with both is used instead of the spur-wheel $n^2$. The stud $n'$ extends beyond the wheel $n^2$, and the valve is so placed that the stem $o$ of the same is encountered by the stud when the sleeve is turned in the opposite direction to that indicated by the arrow on Fig. 2. The action of this arrangement of mechanism is as follows: When the handle $c^2$ is turned after insertion of a coin, the back cylinder $d$ is turned in the manner before described and through the wheels $d^2$, $i$, and $i'$ turns the crown-wheel $i^3$ in the direction shown by arrow on Figs. 2 and 3. The crown-wheel $k$, connected to $k^2$, is held by the pinion $l$, as this pinion is not rotated through the gearing described when the shaft $m^2$ is stationary while no gas is consumed or rotated very slowly while gas is consumed. In consequence the wheel $n^2$ is rolled along the wheel $k$ by the wheel $i^3$ and the stud $n'$ moves through half the arc described by a tooth or wheel $i^3$ and in the same direction away from the valve-stem $o$. The valve is so arranged that it opens by the gas-pressure in the main or its weight or a spring $o^3$ placed around the spindle, and consequently gas enters the meter. For each additional turn of the handle and coin inserted the stud moves through a further equal arc away from the valve-spindle. As the gas is consumed the crown-wheel $k$ is rotated by the shaft $m^2$ through the gearing described in the opposite direction to that in which the wheel $i^3$ is rotated on the insertion of a coin, while this wheel $i^3$ is kept stationary by a catch $d^5$, which engages in a notch $d^6$ made in the back cylinder $d$ for this purpose. In consequence the wheel $n^3$ rolls on the wheel $i^3$, and the sleeve $n$ and stud $n'$ are turned in the opposite direction until, when the gas paid for has been entirely consumed, the stud $n'$ encounters the valve-spindle $o$, and, lifting it, closes the inlet-valve.

Obviously coins may be paid in while gas is being consumed, the motion of the wheel $n^2$ being a differential one in that case. If bevel-wheels are used instead of crown and spur wheels, the action of course is the same. The catch $d^5$ works on a pivot screwed into a lug $b^4$ on the fixed cylinder $b'$. The sleeve $n$, which passes through the wheel $k$ and its screwed boss, has a boss $n^3$ fixed upon it, to which a dial $n^4$ is attached, visible through a glazed opening in the front plate A', on which the number of coins for which gas may be consumed is indicated. In order to prevent the sleeve being turned too far by the insertion of coins and the valve-spindle bent by the stud $n'$ or other injury done, a peg $n^5$, Fig. 2, is fixed in the boss $n^3$, which before the stud $n'$ comes against the side of valve-spindle $o$ encounters the end $p'$ of a bar $p$, which is fulcrumed on a bell-crank lever $p^2$, weighted at the lower limb, so as to hold the parts in the position shown on Figs. 3 and 4. The other end $p^3$ of bar $p$ rests upon the top of the fixed cylinder part $b^2$ at the side of the coin-slot $b$, and, when the peg $n^5$ pushes the end $p^2$, is brought over the slot and prevents the insertion of further coins. Obviously a sliding bar or bolt under spring action may be substituted for the hinged bar and bell-crank.

In order to be able to vary the quantity of gas supplied for each coin inserted, the wheel $k^2$ is made exchangeable and screwed upon the boss of wheel $k$. For this purpose the bearing $l^2$ is made with a detachable cap in front, after removal of which the pinion $l$, with its shaft, can be taken out, when the case has been opened by removing the front plate A', and the wheels $k$ $k'$ taken out. By means of a larger wheel $k'$ the quantity supplied for each coin is increased, and by a smaller one decreased.

As the pressure of the gas actuating the gas-meter mechanism gradually decreases as the inlet-valve is more and more closed, the final closing of the valve presents great difficulties in prepayment-meters, which we overcome in the following way: The main is connected to the inlet $q$ and the gas passes into the chamber $q'$, to the bottom of which the valve-chamber $r$ is soldered. The valve-chamber has inlets $r'$ and outlets $r^2$, opening into the passage $q^2$. Underneath the inlets $r'$ a valve-seating is formed on the chamber, as shown. The valve consists of a recessed disk $o'$, fixed upon the stem $o$, which disk is somewhat larger in diameter than the valve-seating and has stretched over it a leather diaphragm $o^2$, fixed by means of a hoop $o^3$, driven on, and is provided with a central hole. Between the disk $o'$ and a shoulder on the spindle $o$ another leather or rubber diaphragm $r^3$ is nipped and attached gas-tight to the valve-chamber by means of a cap $r^4$. A spring $o^3$ may be placed between the cap and a collar or its equivalent on the spindle $o$ to assist in opening the valve. The diaphragm $r^3$ serves instead of a stuffing-box and insures a gas-tight closure of the valve-chamber. When the valve is lifted up against the seating till the diaphragm $o^2$ comes into contact with the same, the gas under pressure passes into the space behind the diaphragm, and, as the area of the same is larger than the valve-seating, presses the diaphragm upon the seating and tightly closes the valve without requiring any great exertion of pressure upon the valve-spindle.

Figure 13:
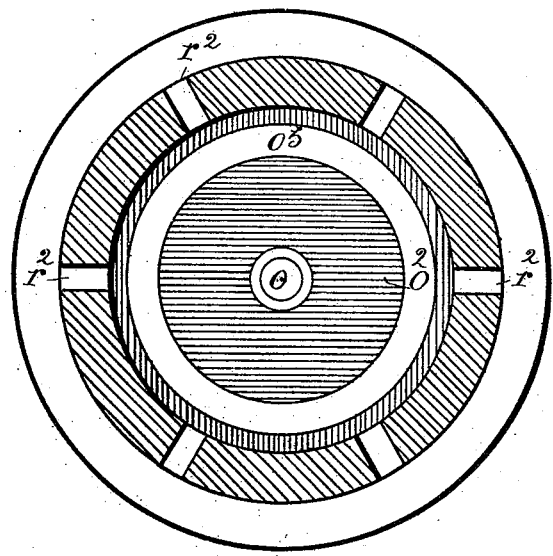

It will be evident from the enlarged drawings in Figs. 12 and 13 that when the valve is closed the gas-pressure in the inlet-port acts upon a circular area of the diaphragm $o^2$ having a diameter equal to the internal diameter of the seating, while it acts on the back of the diaphragm on an area having a diameter equal to the internal diameter of the hoop $o^3$.

From the passage $q^2$, extending over the top of the casing containing the prepayment mechanism, the gas descends through the passage $q^3$ at the back of the casing into the chamber $q^4$. Into the top of this chamber a hollow screwed cap $s$ is fitted, having holes $s'$ in its circumference. This cap is screwed upon a screwed pipe end $t$, which is soldered to the top of the passage $t'$ formed in the gas-meter casing and conducting the gas to the inside of the meter. After the front plate $A'$ has been removed the cap $s$ can be screwed off the pipe $t$ and the casing containing the prepayment mechanism bodily removed. This arrangement permits the meter prepared for the attachment of the prepayment mechanism to be used either with or without the same, the gas-main being in the latter case directly connected to the pipe $t$.

The prepayment mechanism described occupies only a small space, the drawings showing the same in full size, and is positive in its action in consequence of the rotation of the coin-cylinder being transferred to the valve-operating mechanism by means of toothed gearing.

We claim—

1. The combination with a prepayment gas meter of a hollow cylinder fixed in a casing both having slots for the insertion of a coin, two solid cylinders inserted into the fixed cylinder and held apart by a projecting segment on one of them and having slots in their faces for the insertion of said coin, a handle and pointer attached to the front solid cylinder outside of the casing, a lever under spring pressure extending into the space between the cylinders and arranged to eject the coin after half a turn of the cylinder, a lever fulcrumed in a slot of the front cylinder actuated by a fixed inclined segment so as to project and butt against a stop in the back cylinder at the moment of the ejection of the coin and release the stop when an entire revolution of the cylinders has been completed, and mechanism for opening the gas inlet valve operated by the revolution of the cylinders.

2. The combination with a prepayment gas meter of a coin receiver making one entire revolution for each coin inserted, a pinion fixed to the same driving a wheel having another wheel with lateral teeth attached thereto, a sleeve loose on the axis of said wheel, a pivot fixed in said sleeve at a right angle thereto, a pinion mounted on the pivot meshing with said wheel with lateral teeth; a second wheel with lateral teeth loose upon the sleeve and also meshing with said pinion, a crown wheel fixed to the second wheel and meshing with a pinion rotated by the index driving shaft of the meter in the opposite direction to that in which the first wheel is rotated by the pinion fixed to the back cylinder, a gas inlet valve having a stem projecting into the path of the pivot fixed into the sleeve and encountered by the same when the sleeve is rotated backward by said index driving shaft, substantially as and for the purposes described.

3. The combination with a prepayment gas meter of a lever under spring pressure for expelling the coin from the coin receiver, and making one oscillation for each coin inserted, a pawl fulcrumed on said lever and actuating a ratchet wheel on a spindle, and a coin totalizing index driven by said spindle.

4. The combination with a prepayment gas meter of a hollow cylinder fixed in a casing having slots for the insertion and ejection of a coin, two solid cylinders inserted into said fixed cylinder and held apart by a projecting segment on one of them and having slots in their faces for the insertion of said coin, a handle and pointer attached to the front cylinder outside of the casing, a lever under spring pressure extending into the space between said cylinders and arranged to eject the coin after half a turn of the cylinder, a pawl connected thereto actuating a coin totalizing index, a lever fulcrumed in a slot of the front cylinder actuated by a fixed inclined segment so as to project and butt against a stop in the back cylinder at the moment of the ejection of the coin and release the stop when an entire revolution has been completed; a pinion fixed to the back cylinder and driving a wheel having another wheel with lateral teeth attached thereto, a sleeve loose on the axis of said wheel, a pivot fixed in said sleeve at a right angle thereto, a pinion mounted on said pivot meshing with said wheel with lateral teeth, a second wheel with lateral teeth loose upon said sleeve and also meshing with said pinion, a crown wheel fixed to said second wheel and meshing with a pinion rotated by the index driving shaft in the opposite direction to that in which the first wheel is rotated by the pinion fixed to the back cylinder, a gas inlet valve having a stem projecting into the path of the pivot fixed into the sleeve and encountered by the same when the sleeve is rotated backward by said index driving shaft.

5. The combination with a prepayment gas meter of an inlet valve consisting of a valve chamber with central inlet and lateral outlets, a seating formed on the inside of said inlet, a recessed valve disk of larger diameter than said seating and having a flexible diaphragm stretched over it, said diaphragm having an opening in the center, a stem formed on said valve disk and attached gas tight to the center of a diaphragm stretched over the valve casing and attached thereto by means of a cap through which the valve spindle projects.

6. The combination with a prepayment gas meter of a hollow cylinder fixed in a casing having slots for the insertion and ejection of a coin; two solid cylinders inserted into said fixed cylinder and held apart by a projecting segment on one of them and having slots in their faces for the insertion of said coin, a handle and pointer attached to the front cylinder outside of the casing, a lever under spring pressure extending into the space between said cylinders and arranged to eject the coin after half a turn of the cylinder, a lever fulcrumed in a slot of the front cylinder actuated by a fixed inclined segment so as to project and butt against a stop in the back cylinder at the moment of the ejection of the coin and release the stop when an entire revolution has been completed; a pinion fixed to the back cylinder driving a wheel having another wheel with lateral teeth attached thereto, a sleeve loose on the axis of said wheel, a pivot fixed in said sleeve at a right angle thereto, a pinion mounted on said pivot meshing with said wheel with lateral teeth, a second wheel with lateral teeth loose upon said sleeve and also meshing with said pinion, a crown wheel fixed to said second wheel and meshing with a pinion rotated by the index driving shaft in the opposite direction to that in which the first wheel is rotated by the pinion fixed to the back cylinder; a valve chamber with central inlet and lateral outlets, a seating formed on the inside of said inlet, a recessed valve disk of larger diameter than said seating and having a flexible diaphragm stretched over it, said diaphragm having an opening in the center; a stem formed on said valve disk and attached gas tight to the center of a diaphragm stretched over the valve casing and attached thereto by means of a cap through which the valve spindle projects into the path of the pivot on the sleeve and is encountered thereby when the sleeve is rotated backward by said index driving shaft.

7. The combination with a gas meter provided with screwed gas inlet of a casing containing a valve and mechanism for opening the same by means of a coin inserted into the casing and closing it when the quantity paid for has been consumed, a port leading from the valve to the gas meter, an opening in the under side of the port fitting over said gas inlet and an opposite opening in the top side, a screwed flanged cap with lateral openings fitting into the same and attaching the casing to the meter by being screwed upon the inlet pipe.

8. The combination with a prepayment gas meter of a hollow cylinder fixed in a casing having slots for the insertion and ejection of a coin; two solid cylinders inserted into said fixed cylinder and held apart by a projecting segment on one of them and having slots in their faces for the insertion of said coin, a handle and pointer attached to the front cylinder outside of the casing, a lever under spring pressure extending into the space between said cylinders and arranged to eject the coin after half a turn of the cylinder, a lever fulcrumed in a slot of the front cylinder actuated by a fixed inclined segment so as to project and butt against a stop in the back cylinder at the moment of the ejection of the coin and release the stop when an entire revolution has been completed; a pinion fixed to the back cylinder driving a wheel having another wheel with lateral teeth attached thereto, a sleeve loose on the axis of said wheel, a pivot fixed in said sleeve at a right angle thereto, a pinion mounted on said pivot meshing with said wheel with lateral teeth, a second wheel with lateral teeth loose upon said sleeve and also meshing with said pinion, a crown wheel fixed to said second wheel and meshing with a pinion rotated by the index driving shaft in the opposite direction to that in which the first wheel is rotated by the pinion fixed to the back cylinder; a valve chamber with central inlet and lateral outlets, a seating formed on the inside of said inlet, a recessed valve disk of larger diameter than said seating and having a flexible diaphragm stretched over it, said diaphragm having an opening in the center; a stem formed on said valve disk and attached gas tight to the center of a diaphragm stretched over the valve casing and attached thereto by means of a cap through which the valve spindle projects into the path of the pivot on the sleeve and is encountered thereby when the sleeve is rotated backward by said index driving shaft; a port leading from the valve chamber outlet to the gas inlet pipe of the meter, an opening in the under side of said port fitting over said pipe and a flanged cap with lateral openings screwed upon the same through an opening in the top side of the port and thereby attaching the case to the meter.

In testimony whereof we have hereunto affixed our signatures in presence of two witnesses.

THOMAS THORP.
THOMAS GARDINER MARSH.
JOHN HAYNES.

Witnesses:
CARL BOLLÉ,
R. J. URQUHART.